US012769376B2

(12) United States Patent
Aurongzeb et al.

(10) Patent No.: US 12,769,376 B2
(45) Date of Patent: Oct. 20, 2026

(54) HEAT PIPES WITH HIGH RECYCLED CONTENT FOR INFORMATION HANDLING SYSTEMS

(71) Applicant: Dell Products L.P., Round Rock, TX (US)

(72) Inventors: Deeder M. Aurongzeb, Austin, TX (US); Mark Andrew Schwager, Cedar Park, TX (US); Enoch Chen, Wenshan District (TW); Peng Lip Goh, Singapore (SG); Travis C. North, Cedar Park, TX (US)

(73) Assignee: Dell Products L.P., Round Rock, TX (US)

(*) Notice: Subject to any disclaimer, the term of this patent is extended or adjusted under 35 U.S.C. 154(b) by 939 days.

(21) Appl. No.: 17/447,395

(22) Filed: Sep. 10, 2021

(65) Prior Publication Data

US 2023/0081151 A1 Mar. 16, 2023

(51) Int. Cl.

| | |
|---|---|
| ***G06F 1/20*** | (2006.01) |
| ***F28D 15/02*** | (2006.01) |
| ***F28F 21/08*** | (2006.01) |

(52) U.S. Cl.
CPC ........... *G06F 1/20* (2013.01); *F28D 15/0275* (2013.01); *F28F 21/084* (2013.01); *F28F 21/085* (2013.01); *F28F 2275/065* (2013.01)

(58) Field of Classification Search
CPC ... F28D 15/0275; F28F 21/084; F28F 21/085; F28F 2275/065; G06F 1/20
See application file for complete search history.

(56) References Cited

U.S. PATENT DOCUMENTS

2020/0355443 A1* 11/2020 Tochigi ............... F28D 15/0275

FOREIGN PATENT DOCUMENTS

| | | | | | |
|---|---|---|---|---|---|
| JP | 2000156446 | A | * | 6/2000 | |
| JP | 2002062061 | A | * | 2/2002 | F28D 1/0477 |
| JP | 2003179189 | A | * | 6/2003 | F28D 1/0477 |
| KR | 20000035173 | A | * | 11/1999 | |
| WO | WO-2006105919 | A1 | * | 10/2006 | B01L 7/52 |
| WO | WO-2012140652 | A1 | * | 10/2012 | H01L 35/32 |

OTHER PUBLICATIONS

Machine Translation of JP 2000-156446 A (Year: 2000).*
Machine Translation of KR-20000035173-A (Year: 2000).*
Machine Translation of JP-2003179189-A (Year: 2003).*
Machine Translation of JP-2002062061-A (Year: 2002).*

* cited by examiner

*Primary Examiner* — Sathavaram I Reddy
(74) *Attorney, Agent, or Firm* — Norton Rose Fulbright US LLP

(57) ABSTRACT

Disclosed is a covering for an information handling system. The covering includes an aluminum alloy layer that can include at least a portion of recycled aluminum. The covering includes a copper heat pipe that can include at least a portion of recycled copper. The heat pipe and the aluminum alloy layer can be directly coupled to each other, with a heat-conductive carbonaceous material provided at the interface between the aluminum alloy layer and the heat pipe.

20 Claims, 4 Drawing Sheets

HEAT PIPES WITH HIGH RECYCLED CONTENT FOR INFORMATION HANDLING SYSTEMS

BACKGROUND

A. Field of the Disclosure

The disclosure generally relates to a covering for an information handling system. In certain embodiments, the disclosure relates to a metallic covering for an information handling system that is configured to facilitate heat transfer.

B. Description of Related Art

Personal electronic devices decreased in size over the years, and despite a decrease in power consumption by the devices heat management remains an issue for electronics. Information handling systems include integrated heat management components, however, many devices are unable to properly address heating issues. A number of aftermarket components, including cooling pads and external, supplementary fans exist to transfer heat away from these devices. These components may be bulky and require batteries or additional cords for power. Improving upon integrated heat management systems has become more challenging owing in part to the increasing demand placed on system and the shrinking size of the systems.

BRIEF SUMMARY

A heat management system according to embodiments of this disclosure may provide advantages through the use of high recycled content and/or requires fewer components. The heat management system may involve a direct coupling between a heat pipe and a metallic covering. Direct coupling between the heat pipe and metallic covering forgoes the use of screws, reduces the total number of internal components, and reduces device weight. Direct coupling between the heat pipe and metallic covering facilitates heat dissipation because heat dissipation can occur through conventional heat pipes as well as through the directly-coupled metallic covering. The metallic covering can therefore serve a dual purpose as both a covering layer and a heat sink. Thermally-conductive material can be provided between the heat pipe and metallic covering to improve heat transfer and dissipation. By including heat pipe and covering materials that have recycled content, the information handling system can be positioned as an environmentally-friendly alternative over traditional devices.

In some embodiments, a bottom covering or "D" cover for an information handling system can be made. The covering can be made of an aluminum alloy. The covering can be directly coupled to a heat pipe. A carbonaceous material can be provided at the interface between the heat pipe and the covering to facilitate heat transfer from the heat pipe to the covering. The heat pipe can be directly coupled to the covering by ultrasonically welding the heat pipe to the covering. The thickness of the covering can be reduced in areas where the heat pipe is welded to the covering by removing aluminum alloy material from the covering. Aluminum alloy material from the covering can be removed such that the covering thickness is 5% lower than the average thickness of the covering at non-welded positions. The outer covering surface, i.e., the surface opposite the side to which the heat pipe is welded can be anodized. The inner covering surface, i.e., the surface to which the heat pipe is welded can be a non-anodized surface. A carbonaceous material can be provided between the covering and the heat pipe to facilitate heat transfer from the heat pipe to the covering. The heat pipe can be positioned adjacent to a cooling fan to dissipate heat in airflow generated by the cooling fan during operation of the information handling system.

Certain aspects of this disclosure are directed to a covering for an information handling system that can include a first layer having a first surface and a second surface, and a heat pipe welded to the first surface of the first layer. In some aspects, the heat pipe comprises metallic copper. In some aspects, at least 50 wt. % of the copper in the heat pipe is recycled copper. In some aspects, from 50 wt. % to 70 wt. % of the copper in the heat pipe is recycled copper. The heat pipe can include 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt. % of recycled copper. In some aspects, the heat pipe has an average height less than 1 mm. The heat pipe can have an average height of 0.99, 0.98, 0.97, 0.96, 0.95, 0.94, 0.93, 0.92, 0.91, 0.90, 0.89, 0.88, 0.87, 0.86, 0.85, 0.84, 0.83, 0.82, 0.81, or 0.80 mm, in some aspects. In some aspects, the heat pipe has a non-uniform height across the length of the heat pipe. One or more positions along the length of the heat pipe can be configured to provide structural support to the covering. In some aspects, positions with higher height are configured to provide structural support to the covering. In some aspects, the heat along the length of the aluminum layer in a sufficiently straight line. The heat pipe can be welded to the first surface of the first layer through ultrasonic welding, cold welding, solid state diffusion welding, or laser welding.

In some aspects, the first layer comprises an aluminum alloy. The aluminum alloy can include at least one of 5052-aluminum alloy, 6061-aluminum alloy, and 6063-aluminum alloy. In some aspects, the aluminum alloy can include aluminum and at least one of magnesium, silicon, and chromium. In some aspects, at least 60 wt. % of the aluminum in the first layer is recycled aluminum. In some aspects, the aluminum in the first layer includes from 60 wt. % to 80 wt. % of recycled aluminum. The aluminum in the first layer can include 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt. % of recycled aluminum. In some aspects, the first layer can have a length, a width, and a height or thickness. In some aspects, the thickness of the first layer is constant across the entire area (length×width) of the first layer. In some aspects, the thickness of the first layer can vary throughout the area (length×width) of the first layer. In embodiments where the thickness of the first layer varies, an average thickness of the first layer can be selected. The first layer can have an average thickness ranging from 0.40 mm to 1.0 mm. The first layer can have an average thickness of 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or 1.0 mm, in some aspects. The first surface of the first layer can be anodized or not anodized. The second surface of the first layer can be anodized or not anodized. In some aspects, the first surface is not anodized and the second surface is anodized.

The heat pipe can be welded to the first surface of the first layer at various positions along the heat pipe-first surface interface. The average thickness of the first layer at positions where the heat pipe is welded to the first layer can be different from the average thickness of the first layer at positions where the heat pipe is not welded to the first layer. In some aspects, the average thickness of the first layer at positions where the heat pipe is welded of the first layer is 5% to 10% lower than the average thickness of the layer at non-welded positions. In some aspects, a carbonaceous material is provided at the interface between the heat pipe and the first surface of the first layer. In some aspects, the carbonaceous material is graphite, graphene, a carbon coating, a graphene-containing paint, or any combination thereof. In some aspects, the carbonaceous material can include up to 80% by weight of graphene. The carbonaceous material can include 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight of graphene, in some aspects. In some aspects, the carbonaceous material can be provided in a thickness ranging from 100 nm to 50 μm. The carbonaceous material can be provided in a thickness of 100 nm, 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, 10 μm, 20 μm, 30 μm, 40 μm or 50 μm, or any value therein. In particular aspects, the carbonaceous material is provided in a thickness of 5 μm.

Some aspects of the disclosure are directed to an information handling system that can include a chassis configured to at least partially enclose an enclosed volume containing components of the information handling system. In some aspects, at least a part of the chassis comprises a covering that includes a first layer comprising an aluminum alloy, and having a first surface and a second surface, and a heat pipe ultrasonically welded to the first surface of the first layer. In some aspects, the heat pipe is configured to conduct heat away from at least one component of the information handling system components. The covering can include a cooling fan attached to the first surface with at least a portion of the heat pipe being positioned near the cooling fan. In some aspects, the heat pipe is configured to dissipate heat in airflow generated by the cooling fan during operation of the information handling system. In some aspects, the covering forms at least a portion of a back covering of the information handling system.

Other embodiments of the disclosure are discussed throughout this application. Any embodiment discussed with respect to one aspect of the disclosure applies to other aspects of the disclosure as well and vice versa. Each embodiment described herein is understood to be embodiments of the disclosure that are applicable to other aspects of the disclosure. It is contemplated that any embodiment discussed herein can be implemented with respect to any method or composition of the disclosure, and vice versa. Furthermore, compositions the disclosure can be used to achieve methods of the disclosure.

The following includes definitions of various terms and phrases used throughout this specification.

As used herein, the term "coupled" is defined as being connected, although not necessarily directly, not necessarily mechanically. As used herein recycle content of a material refers to wt. % of the material obtained from, made from and/or recovered from waste. Unless mentioned otherwise the waste can be post-industrial and post-consumer waste. Post-consumer waste of a material is a waste generated by a customer of a substrate containing the material. Post-industrial waste is waste generated during a production process of a product and has not used in the consumer market.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component. The term "ppm" refer to parts per million by weight, based on the total weight, of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The covering of the present disclosure can "comprise," "consist(s) essentially of," or "consist of" particular ingredients, components, compositions, etc. disclosed throughout the specification. In one aspect of the present disclosure, and with reference to the transitional phrase "consist(s) essentially of" or "consisting essentially of," a basic and novel characteristic of the present disclosure can include a covering containing an aluminum alloy layer that can include at least a portion of recycled aluminum, and a copper heat pipe that can include at least a portion of recycled copper. The heat pipe and the aluminum alloy layer can be directly coupled to each other, with a heat-conductive carbonaceous material provided at the interface between the aluminum alloy layer and the heat pipe.

Other objects, features and advantages of the present disclosure will become apparent from the following detailed description and examples. It should be understood, however, that the detailed description and examples, while indicating specific embodiments of the disclosure, are given by way of illustration only and are not meant to be limiting. Additionally, it is contemplated that changes and modifications within the spirit and scope of the disclosure will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present disclosure may become apparent to those skilled in the art with the benefit of the following detailed description and upon reference to the accompanying drawings. While the disclosure is susceptible to various modifications and alternative forms, specific embodiments thereof are shown by way of example in the drawings. The drawings may not be to scale.

DETAILED DESCRIPTION

Heat pipe designs for information handling systems are improved through one or more of better heat pipe shape and adjacent covering construction and assembly, and may omit ore replace the use of heat pipe fastening screws. By eliminating commonly-employed heat pipe fastening screws, the number of parts can be reduced, and structural deflection of the heat pipe at screw points can be avoided. The heat pipe can be directly bonded to a metallic cover portion, which can act as heat sink that aids in heat dissipation. Direct bonding of the heat pipe to the covering also enhances heat pipe stiffness and structural rigidity. A carbonaceous material coating can be provided at the heat pipe-covering interface, which further enhances heat transfer and dissipation away from the heat pipe. The heat pipe height can be varied along the length of the heat pipe to allow for variable stiffness. The degree of height variation can be adjusted for specific designs and corresponding stiffness requirements.

These and other non-limiting aspects of the present disclosure are discussed in further detail in the following sections.

Figure 1:
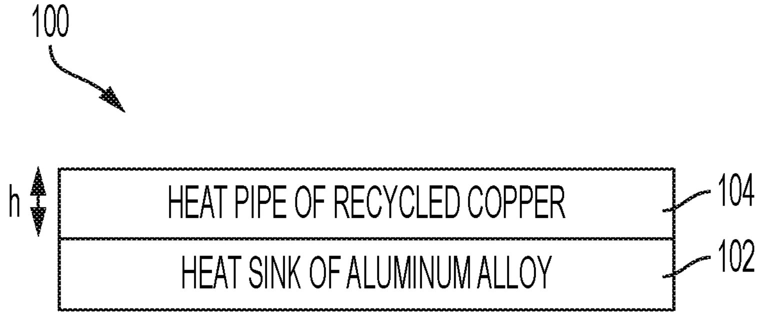
FIG. 1: Schematic of a covering for an information handling system according to an example of the present disclosure.

Referring to FIG. 1, a schematic of a covering 100 according to one example of the present disclosure is shown. The covering 100 includes a heat sink covering layer 102 that is made of aluminum alloy. The heat sink layer 102 may be coupled to a heat pipe 104 made of recycled copper. A heat pipe 104 made of recycled copper is directly coupled to the covering layer 102 to enable efficient heat transfer and dissipation. In some embodiments, the heat pipe 104 may be welded to the covering layer 102. In some embodiments, a carbonaceous material coating can be provided between the heat pipe 104 and the covering layer 102 in order to facilitate heat transfer from the heat pipe 104 to the covering 102. The heat pipe height may increase as the distance from a heat source increases. For example, the heat source, such as a CPU or other component of an information handling system, may be located near the $t_1$ end of heat pipe 104. The heat pipe height may alternatively decrease as the distance from a heat source increases. For example, the heat source may be located near the $t_2$ end of heat pipe 104. In some embodiments, the heat sink layer 102 may be a portion of a chassis of an information handling system. In some embodiments, the heat sink layer 102 may be coupled to, such as by welding to, a chassis of an information handling system.

Figure 2:
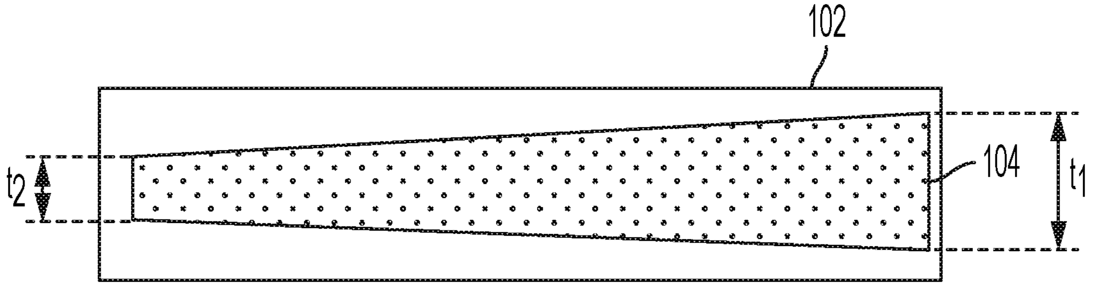
FIG. 2: Schematic of a covering for an information handling system according to an example of the present disclosure.

As shown in FIG. 2, the height of the heat pipe 104 can be varied along the length of the heat pipe to allow for variable stiffness. The degree of height variation, shown as a change from thickness $t_2$ to a thickness $t_1$, can be adjusted for specific designs and corresponding stiffness requirements. In a particular embodiments, the height can decrease 10% per centimeter of distance away from a section of the heat pipe that is adjacent to a cooling fan. In some embodiments, the thickness difference may refer to a vertical distance out of the plane of the paper and perpendicular to the circuit board adjacent the heat sink 102, perpendicular to the chassis adjacent to the aluminum alloy chassis, and the thickness may decrease as the distance from the heat source increases.

Figure 3:
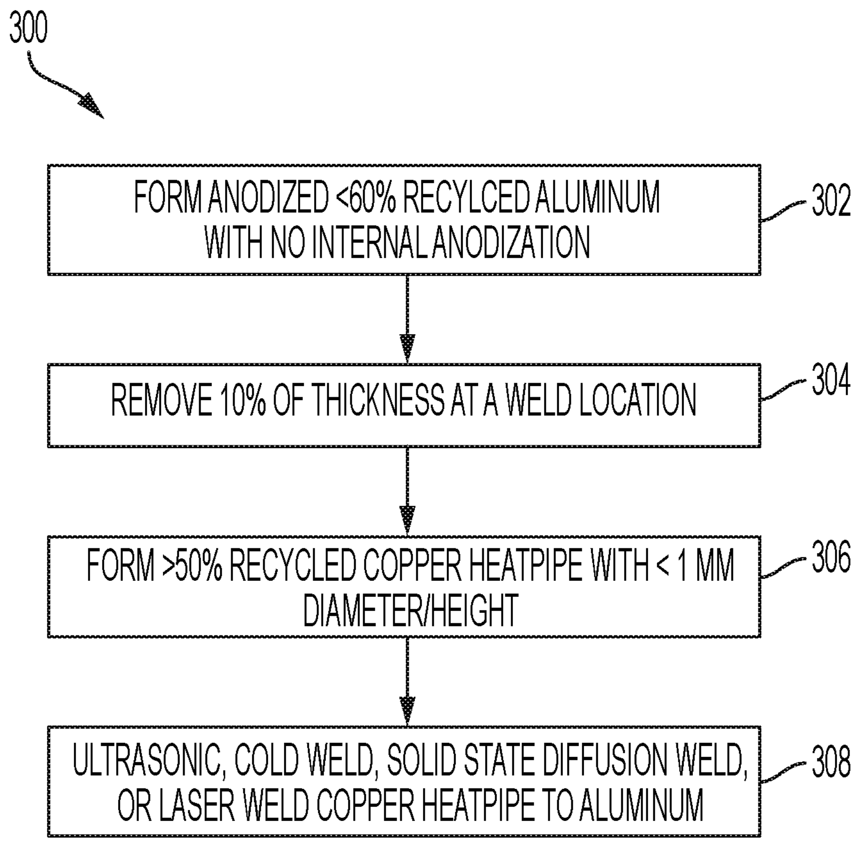
FIG. 3: Schematic of process steps employed for assembling a covering for an information handling system according to an example of the present disclosure.

FIG. 3 includes a schematic of process steps 300 that can be employed for assembling a covering for an information handling system according to an example of the present disclosure. The process includes providing a layer made of recycled aluminum at block 302, removing a portion (e.g., approximately 10%, between 5-15%, or between 1-25%) of the layer thickness at locations where a weld will be provided at block 304, applying a heat pipe made of at least 50% recycled copper at block 306, and welding the copper heat pipe to the aluminum covering layer at block 308 at the weld location created by the removal of thickness at block 304.

In the first step 302, an aluminum layer that includes less than 60% of recycled aluminum with no internal anodization is formed. In the second step 304, a portion of the aluminum layer thickness is removed in areas where the heat pipe will be bonded. In the depicted embodiment, 10% of the aluminum layer thickness is removed in areas where the heat pipe will be bonded. The degree to which aluminum layer thickness is reduced or removed will vary depending on the particular application. In some aspects, the aluminum layer thickness can be reduced up to 20%. The aluminum layer thickness can be reduced 1%, 2%, 3%, 4%, 5%, 6%, 7%, 8%, 9%, 10%, 11%, 12%, 13%, 14%, 15%, 16%, 17%, 18%, 19%, or 20% in areas where the heat pipe will be bonded to the aluminum layer. In some aspects, the reduction of aluminum layer thickness is based on the average thickness of the aluminum layer at non-bonded or non-welded positions. In some embodiments, the thickness removed decreases the dimension of the heat pipe perpendicular to the surface of the information handling system chassis when installed. In some embodiments, the thickness removed decreases the dimension of the heat pipe parallel to the surface of the information handling system chassis when installed. In the third step 306, a copper heat pipe is formed. In some aspects, the copper heat pipe includes greater than 50% of recycled copper. In some aspects, the copper heat pipe can have a height, width, and/or diameter of up to 1 mm. In the fourth step 308, the heat pipe is coupled to the aluminum layer. The heat pipe can be coupled to the aluminum layer by any coupling means known in the art, including but not limited to ultrasonic welding, cold welding, solid state diffusion welding, or laser welding. Coupling of the heat pipe directly to the aluminum layer aids in transfer of heat from the heat pipe to the aluminum layer. In some aspects, a carbonaceous material coating can be provided between the heat pipe and the aluminum layer to enhance thermal energy transfer from the heat pipe to the aluminum layer. In some aspects, the carbonaceous material coating can fill microscopic gaps and surface imperfections on the heat pipe and aluminum layer surfaces, and allow for more efficient transfer of heat.

Figure 4:
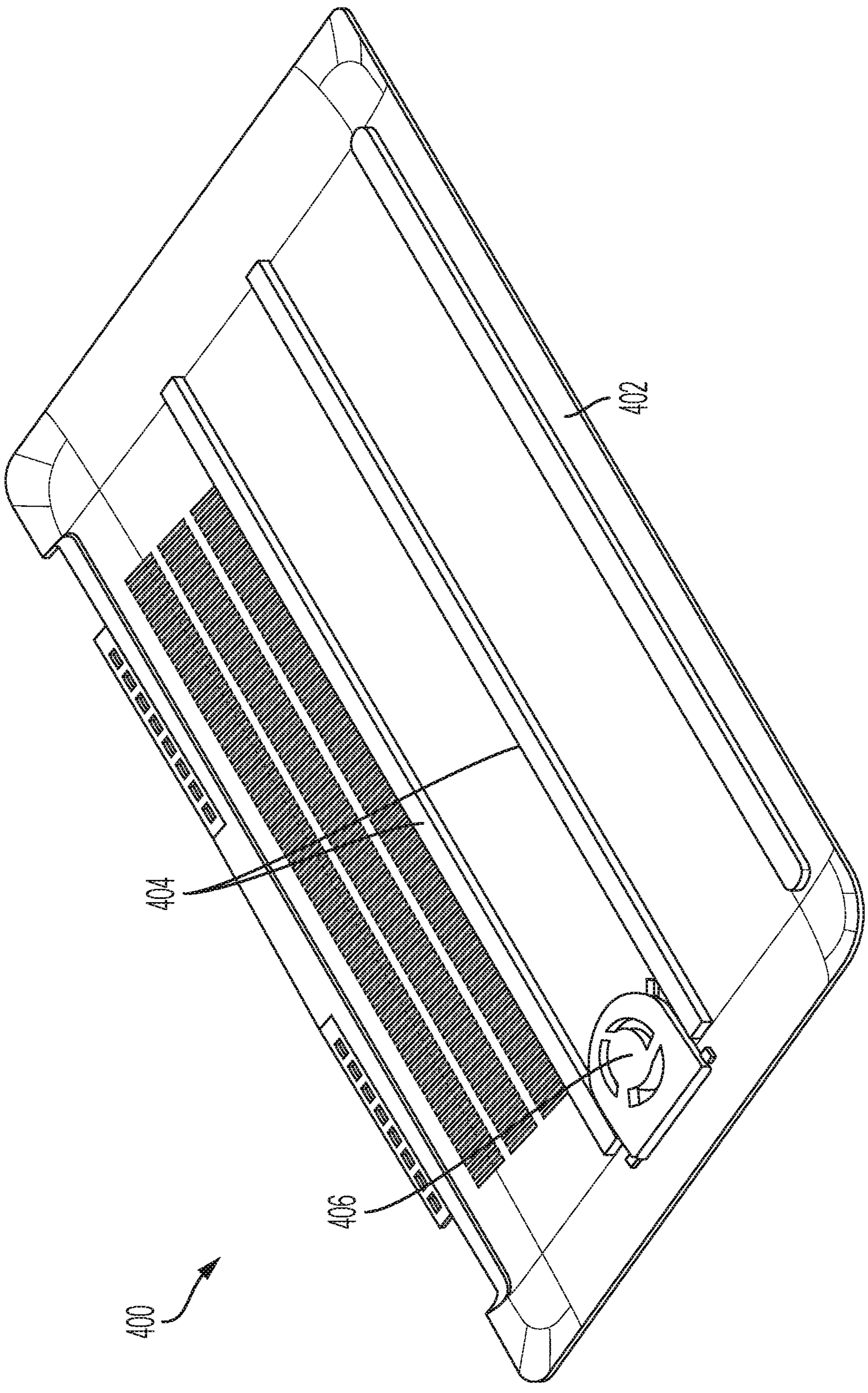
FIG. 4: Schematic of a covering according to an example of the present disclosure.

Referring to FIG. 4, a schematic of a covering 400 according to one example of the present disclosure is shown. The covering 400 include an aluminum covering layer 402, two heat pipes 404 coupled to the covering 402. The heat pipes 404 are coupled to a cooling fan 406. A cooling fan 406 is provided adjacent to a heat source, e.g., a laptop CPU. The cooling fan 406 is adjacent to a pair of heat pipes 404. The heat pipes 404 are bonded directly to aluminum laptop D cover 402. In some embodiments, the heat pipes 404 are symmetric about the heat component. In some embodiments, the heat pipes 404 are symmetric in that the heat pipe on each side of the cooling fan 406 is identical in size and orientation with respect to the cooling fan 406. In some embodiments, the heat pipes 404 taper in thickness as the heat pipes 404 extend from the cooling fan 406 and the heat source coupled to the cooling fan 406. The cooling fan 406 facilitates transfer of heat from a heat source to heat pipes 404. The heat pipes 404 are directly coupled to covering 402, thereby enabling heat transfer to from heat pipes 404 to covering 402.

Figure 5:
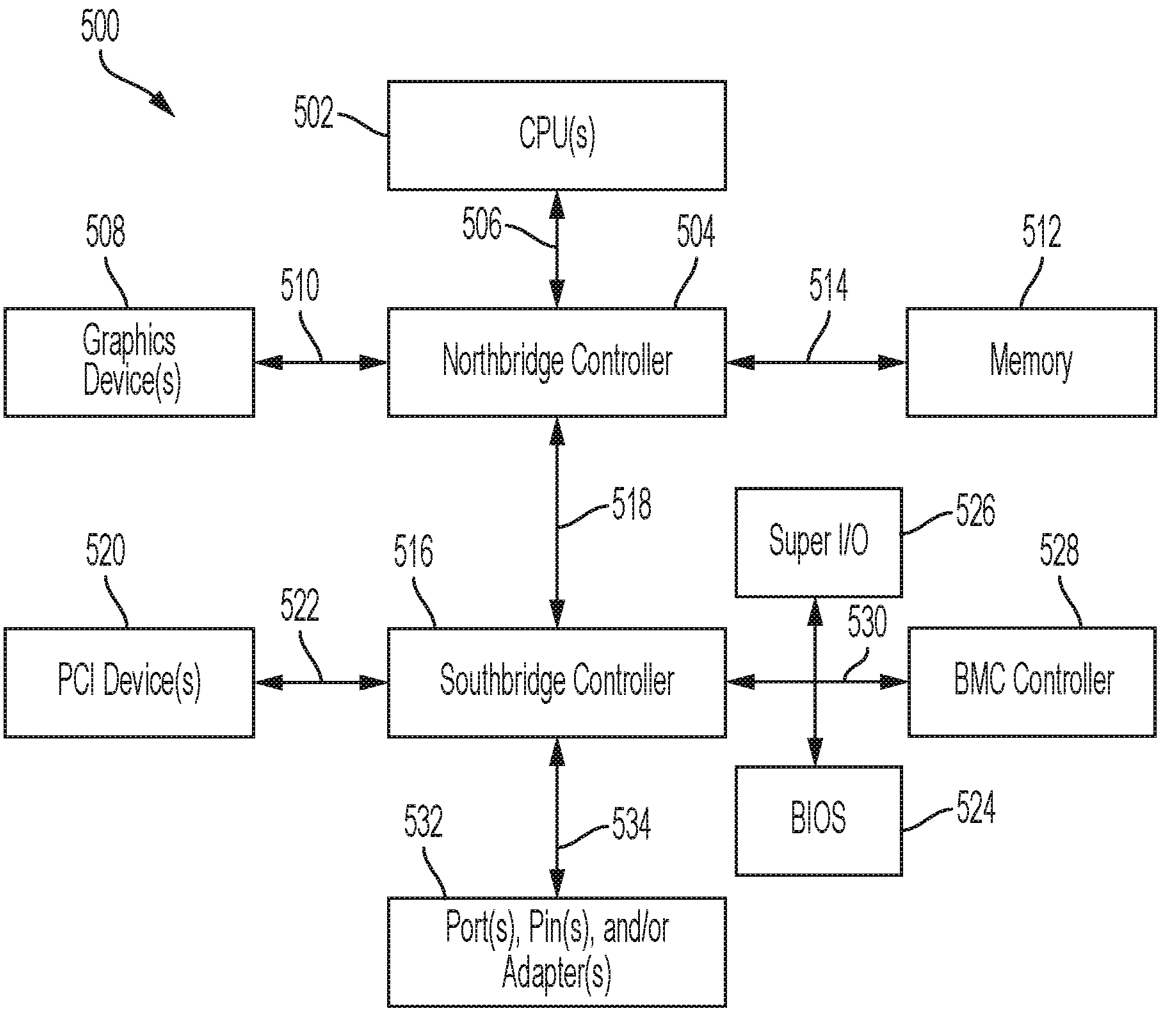
FIG. 5: Schematic of an information handling system that may contain the fan unit according to an example of the present disclosure.

FIG. 5 is a block diagram of an information handling system according to some embodiments of the disclosure. An information handling system may include a variety of components to generate, process, display, manipulate, transmit, and receive information, any of which may generate heat and be coupled to a fan housed in the materials and in the configured in the configurations described in various embodiments herein. One example of an information handling system 500 is shown in FIG. 5. IHS 500 may include one or more central processing units (CPUs) 502. In some embodiments, IHS 500 may be a single-processor system with a single CPU 502, while in other embodiments IHS 500 may be a multi-processor system including two or more CPUs 502 (e.g., two, four, eight, or any other suitable number). CPU(s) 502 may include any processor capable of executing program instructions. For example, CPU(s) 502 may be processors capable of implementing any of a variety of instruction set architectures (ISAs), such as the ×86, POWERPC®, ARM®, SPARC®, or MIPS® ISAs, or any other suitable ISA. In multi-processor systems, each of CPU(s) 502 may commonly, but not necessarily, implement the same ISA.

CPU(s) 502 may be coupled to northbridge controller or chipset 504 via front-side bus 506. The front-side bus 506 may include multiple data links arranged in a set or bus configuration. Northbridge controller 504 may be configured to coordinate I/O traffic between CPU(s) 502 and other components. For example, northbridge controller 504 may be coupled to graphics device(s) 508 (e.g., one or more video cards or adaptors, etc.) via graphics bus 510 (e.g., an Accelerated Graphics Port or AGP bus, a Peripheral Component Interconnect or PCI bus, etc.). Northbridge controller 504 may also be coupled to system memory 512 via memory bus 514. Memory 512 may be configured to store program instructions and/or data accessible by CPU(s) 502. In various embodiments, memory 512 may be implemented using any suitable memory technology, such as static RAM (SRAM), synchronous dynamic RAM (SDRAM), nonvolatile/Flash-type memory, or any other type of memory.

Northbridge controller 504 may be coupled to southbridge controller or chipset 516 via internal bus 518. Generally, southbridge controller 516 may be configured to handle various of IHS 500's I/O operations, and it may provide interfaces such as, for instance, Universal Serial Bus (USB), audio, serial, parallel, Ethernet, etc., via port(s), pin(s), and/or adapter(s) 532 over bus 534. For example, southbridge controller 516 may be configured to allow data to be exchanged between IHS 500 and other devices, such as other IHSs attached to a network. In various embodiments, southbridge controller 516 may support communication via wired or wireless data networks, such as any via suitable type of Ethernet network, via telecommunications/telephony networks such as analog voice networks or digital fiber communications networks, via storage area networks such as Fiber Channel SANs, or via any other suitable type of network and/or protocol.

Southbridge controller 516 may also enable connection to one or more keyboards, keypads, touch screens, scanning devices, voice or optical recognition devices, or any other devices suitable for entering or retrieving data. Multiple I/O devices may be present in IHS 500. In some embodiments, I/O devices may be separate from IHS 500 and may interact with IHS 500 through a wired or wireless connection. As shown, southbridge controller 516 may be further coupled to one or more PCI devices 520 (e.g., modems, network cards, sound cards, video cards, etc.) via PCI bus 522. Southbridge controller 516 may also be coupled to Basic I/O System (BIOS) 524, Super I/O Controller 526, and Baseboard Management Controller (BMC) 528 via Low Pin Count (LPC) bus 530.

IHS 500 may be configured to access different types of computer-accessible media separate from memory 512. Generally speaking, a computer-accessible medium may include any tangible, non-transitory storage media or memory media such as electronic, magnetic, or optical media, including a magnetic disk, a hard drive, a CD/DVD-ROM, and/or a Flash memory. Such mediums may be coupled to IHS 500 through various interfaces, such as universal serial bus (USB) interfaces, via northbridge controller 504 and/or southbridge controller 516. Some such mediums may be coupled to the IHS through a Super I/O Controller 526 combines interfaces for a variety of lower bandwidth or low data rate devices. Those devices may include, for example, floppy disks, parallel ports, keyboard and mouse and other user input devices, temperature sensors, and/or fan speed monitoring.

BIOS 524 may include non-volatile memory having program instructions stored thereon. The instructions stored on the BIOS 524 may be usable by CPU(s) 502 to initialize and test other hardware components. The BIOS 524 may further include instructions to load an Operating System (OS) for execution by CPU(s) 502 to provide a user interface for the IHS 500, with such loading occurring during a pre-boot stage. In some embodiments, firmware execution facilitated by the BIOS 524 may include execution of program code that is compatible with the Unified Extensible Firmware Interface (UEFI) specification, although other types of firmware may be used.

BMC controller 528 may include non-volatile memory having program instructions stored thereon that are usable by CPU(s) 502 to enable remote management of IHS 500. For example, BMC controller 528 may enable a user to discover, configure, and/or manage BMC controller 528. Further, the BMC controller 528 may allow a user to setup configuration options, resolve and administer hardware or software problems, etc. Additionally or alternatively, BMC controller 528 may include one or more firmware volumes, each volume having one or more firmware files used by the BIOS firmware interface to initialize and test components of IHS 500.

One or more of the devices or components shown in FIG. 5 may be absent, or one or more other components may be added. Further, in some embodiments, components may be combined onto a shared circuit board and/or implemented as a single integrated circuit (IC) with a shared semiconductor substrate. For example, northbridge controller 504 may be combined with southbridge controller 516, and/or be at least partially incorporated into CPU(s) 502. Accordingly, systems and methods described herein may be implemented or executed with other computer system configurations. In some cases, various elements shown in FIG. 5 may be mounted on a motherboard and enclosed within a chassis of the IHS 500.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

What is claimed is:

1. A covering for an information handling system, the covering comprising:

a first layer comprising an aluminum alloy, and having a first surface and a second surface; and a heat pipe ultrasonically welded to the first surface of the first layer, the heat pipe having a first end having a first height and a second end having a second height, wherein the heat pipe has a continuously increasing non-uniform height across the length of the heat pipe from the first end of the heat pipe to the second end of the heat pipe, and wherein the second height is greater than the first height.

2. The covering of claim 1, wherein the heat pipe comprises metallic copper.

3. The covering of claim 2, wherein at least 50 wt. % of the metallic copper in the heat pipe is recycled copper.

4. The covering of claim 3, wherein 50 wt. % to 70 wt. % of the metallic copper in the heat pipe is recycled copper.

5. The covering of claim 1, wherein the heat pipe extends along the length of the first layer in a symmetric shape.

6. The covering of claim 1, wherein the aluminum alloy comprises aluminum and at least one of magnesium, silicon, or chromium.

7. The covering of claim 1, wherein the aluminum alloy comprises at least one of 5052-aluminum alloy, 6061-aluminum alloy, or 6063-aluminum alloy.

8. The covering of claim 1, wherein at least 60 wt. % of the aluminum in the first layer is recycled aluminum.

9. The covering of claim 1, wherein the first layer has an average thickness of 0.4 mm to 1 mm.

10. The covering of claim 1, wherein the average thickness of the first layer at positions where the heat pipe is welded is 5% to 10% lower than the average thickness of the layer at non-welded positions.

11. The covering of claim 1, wherein the second surface is an anodized surface.

12. The covering of claim 11, wherein the first surface is not anodized.

13. The covering of claim 1, further comprising a carbonaceous material at the interface between the heat pipe and the first surface.

14. The covering of claim 1, wherein the first end is situated closer to a heat source of the information handling system than the second end.

15. The covering of claim 1, wherein the first end of the heat pipe is coupled to the first surface of the first layer and the second end of the heat pipe is coupled to the first surface of the first layer.

16. An information handling system, comprising:

a chassis configured to at least partially enclose an enclosed volume containing components of the information handling system, in which at least a part of the chassis comprises a covering comprising:

a first layer comprising an aluminum alloy, and having a first surface and a second surface; and a heat pipe ultrasonically welded to the first surface of the first layer, the heat pipe a first end having a first height and a second end having a second height, wherein the heat pipe has a continuously increasing non-uniform height across the length of the heat pipe from the first end of the heat pipe to the second end of the heat pipe, wherein the second height is greater than the first height, wherein the heat pipe is configured to conduct heat away from at least one component of the information handling system components, and wherein the covering forms at least a portion of a back covering of the information handling system.

17. The information handling system of claim 16, wherein the second surface is an anodized surface, and forms at least a portion of an outer surface of the chassis of the information handling system.

18. The information handling system of claim 16, further comprising a cooling fan attached to the first surface, wherein at least a portion of the heat pipe is positioned near the cooling fan, and wherein the heat pipe is configured to dissipate heat in airflow generated by the cooling fan during operation of the information handling system.

19. A method, comprising:

forming an anodized aluminum layer comprising at least 60% recycled content;

removing a portion of thickness at a weld location on the anodized aluminum layer;

forming a copper heat pipe comprising at least 50% recycled content; and welding the copper heat pipe to the anodized aluminum layer, wherein the copper heat pipe has a first end having a first height and a second end having a second height, wherein the copper heat pipe has a continuously increasing non-uniform height across the length of the copper heat pipe from the first end of the copper heat pipe to the second end of the copper heat pipe, and wherein the second height is greater than the first height.

20. The method of claim 19, wherein welding the copper heat pipe to the anodized aluminum layer comprises ultrasonically welding the copper heat pipe to the anodized aluminum layer.

* * * * *